(12) United States Patent  
Zhou et al.

(10) Patent No.: US 7,944,454 B2  
(45) Date of Patent: May 17, 2011

(54) SYSTEM AND METHOD FOR USER MONITORING INTERFACE OF 3-D VIDEO STREAMS FROM MULTIPLE CAMERAS

(75) Inventors: Hanning Zhou, Palo Alto, CA (US); Qiong Liu, Milpitas, CA (US); Donald Kimber, Foster City, CA (US); Lynn Wilcox, Palo Alto, CA (US); Matthew L. Cooper, San Francisco, CA (US)

(73) Assignee: Fuji Xerox Co., Ltd., Tokyo (JP)

( * ) Notice: Subject to any disclaimer, the term of this patent is extended or adjusted under 35 U.S.C. 154(b) by 1589 days.

(21) Appl. No.: 11/220,730

(22) Filed: Sep. 7, 2005

(65) Prior Publication Data

US 2007/0052807 A1    Mar. 8, 2007

(51) Int. Cl.
*G09G 5/00*       (2006.01)
*G06F 3/048*      (2006.01)

(52) U.S. Cl. ........ 345/629; 715/243; 715/782; 345/638; 348/170

(58) Field of Classification Search ................. 348/170, 348/169; 382/173; 345/629, 638, 170; 715/243, 715/782

See application file for complete search history.

(56) References Cited

U.S. PATENT DOCUMENTS

| | | | | |
|---|---|---|---|---|
| 5,729,471 A | * | 3/1998 | Jain et al. | 725/131 |
| 6,097,393 A | * | 8/2000 | Prouty et al. | 345/419 |
| 6,271,805 B1 | * | 8/2001 | Yonezawa | 345/1.1 |
| 6,563,529 B1 | * | 5/2003 | Jongerius | 348/36 |
| 6,909,458 B1 | * | 6/2005 | Suzuki et al. | 348/211.8 |
| 6,987,883 B2 | * | 1/2006 | Lipton et al. | 382/173 |
| 7,142,209 B2 | * | 11/2006 | Uyttendaele et al. | 345/427 |
| 7,224,735 B2 | * | 5/2007 | Porikli et al. | 375/240.25 |
| 2005/0207617 A1 | * | 9/2005 | Sarnoff | 382/103 |
| 2006/0233461 A1 | * | 10/2006 | Ma et al. | 382/285 |

OTHER PUBLICATIONS

Stauffer C, Grimson W.E.L., Learning patterns of activity using real-time tracking. IEEE Transactions on Pattern Analysis & Machine Intelligence, 2000. 22(8): p. 747-57.

Sawhney, H.S., Arpa, A., Kumar, R., Samarasekera, S., Aggrwal, M., Hsu, S., Nister, D., and Hanna, K. 2002. Video flashlights: real time rendering of multiple videos for immersive model visualization.

Viola, P.; Jones, M.J.; Snow, D., "Detecting Pedestrians Using Patterns of Motion and Appearance", IEEE International Conference on Computer Vision (ICCV), vol. 2, pp. 734-741, Oct. 2003.

(Continued)

*Primary Examiner* — Michelle K Lay
(74) *Attorney, Agent, or Firm* — Morgan, Lewis & Bockius LLP

(57) ABSTRACT

Embodiments of the present invention introduce a user navigation interface that allows a user to monitor/navigate video streams captured from multiple cameras. It integrates video streams from multiple cameras with the semantic layout into a 3-D immersive environment and renders the video streams in multiple displays on a user navigation interface. It conveys the spatial distribution of the cameras as well as their fields of view and allows a user to navigate freely or switch among preset views. This description is not intended to be a complete description of, or limit the scope of, the invention. Other features, aspects, and objects of the invention can be obtained from a review of the specification, the figures, and the claims.

21 Claims, 14 Drawing Sheets
(12 of 14 Drawing Sheet(s) Filed in Color)

OTHER PUBLICATIONS

Cox, T.F. and Cox, M.A.A., Multidimensional Scaling, Chapman & Hall/CRC Press: Boca Rotan, ISBN 1-58488-094-5, 2000.

I.O. Sebe, J. Hu, S. You, U. Neumann, 3D Video Surveillance, pp. 107-112, Berkeley, California, (in conjunction with ACM Multimedia 2003), Nov. 7, 2003.

Kameda, Y., Takemasa, T. and Ohta, Y., Outdoor see-through vision utilizing surveillance cameras, Third IEEE and ACM International Symposium on Mixed and Augmented Reality, Nov. 2-5, 2004 pp. 151-160.

Isard Michael et al., "ICondensation: Unifying low-level and high-level tracking in a stochastic framework," *Proceedings of the 5th European Conference on Computer Vision*, 1998, 16 pages.

* cited by examiner

SYSTEM AND METHOD FOR USER MONITORING INTERFACE OF 3-D VIDEO STREAMS FROM MULTIPLE CAMERAS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

This invention relates to the field of multi-camera video monitoring, and display and navigation.

2. Description of the Related Art

Recent years have witnessed the emergence of numerous video surveillance systems, most of them consist of multiple cameras. The visualization of video streams in such systems has been limited to 2-D, and it costs the security staffs excessive efforts to keep track of the spatial location of the physical scene that each camera is capturing. It is thus desirable to alleviate this difficult problem by bringing the 2-D displays into a 3-D immersive 3-D environment, in which the security staffs can navigate intuitively and inspect any corner of the scene at a click of the mouse.

SUMMARY OF THE INVENTION

Various embodiments of the present invention introduces a user navigation interface that allows a user to monitor/navigate video streams (videos) captured from multiple cameras. It integrates video streams from multiple cameras with the semantic layout into a 3-D immersive environment and renders the video streams in multiple displays on a user navigation interface. It conveys the spatial distribution of the cameras as well as their fields of view and allows a user to navigate freely or switch among preset views. In addition, it allows the user to track a moving object in the video streams with the largest screen resolution of the display having the best view of the object.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Certain embodiments of the present invention will be described in detail on the following figures, wherein.

DETAILED DESCRIPTION

The invention is illustrated by way of example and not by way of limitation in the figures of the accompanying drawings in which like references indicate similar elements. It should be noted that references to "an" or "one" or "some" embodiment(s) in this disclosure are not necessarily to the same embodiment, and such references mean at least one.

Figure 1:
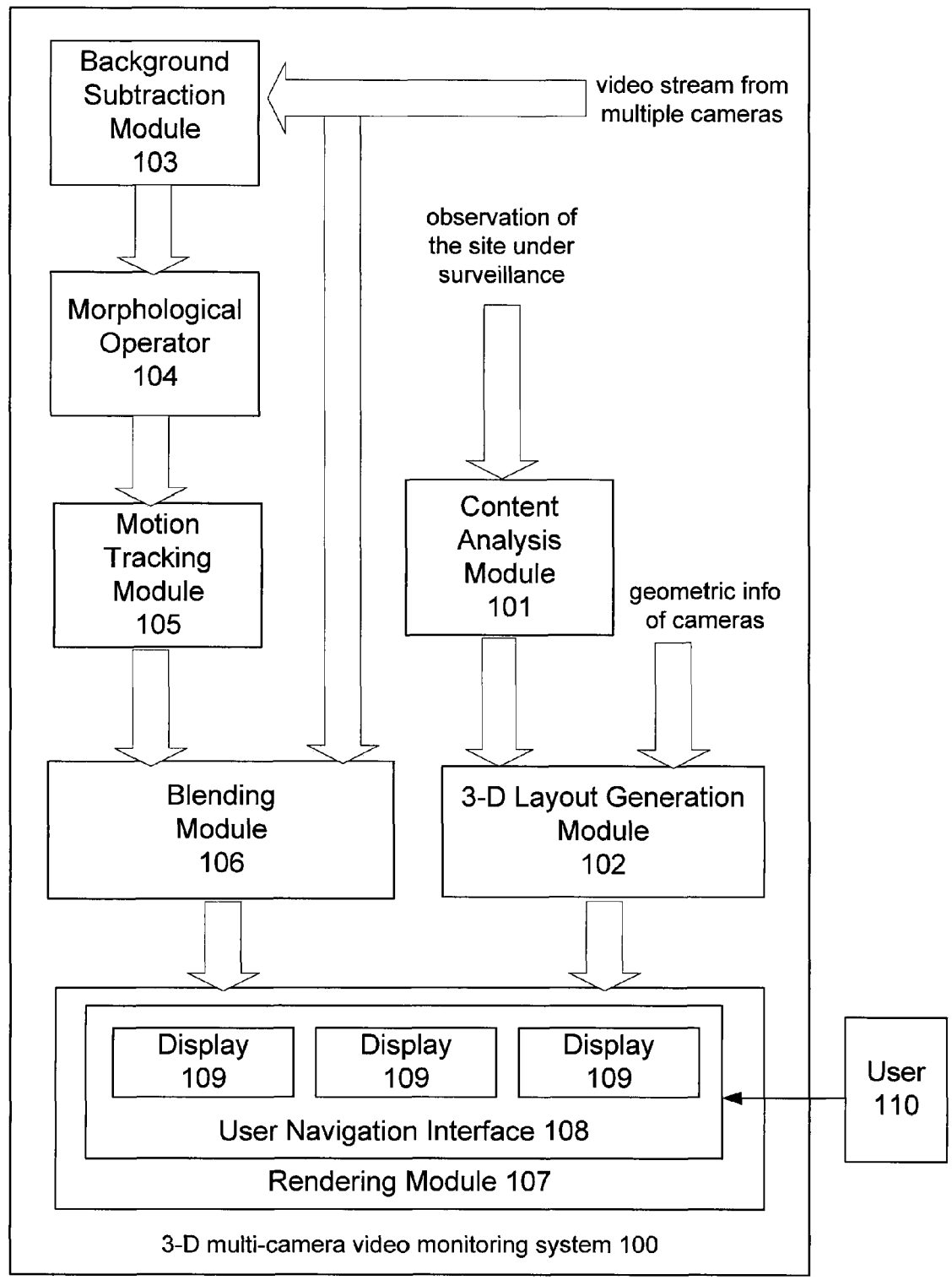
FIG. 1 is an illustration of an exemplary 3-D multi-camera video monitoring system in one embodiment of the present invention.

FIG. 1 is an illustration of an exemplary 3-D multi-camera video monitoring and navigation system 100 in one embodiment of the present invention. Although this diagram depicts components as functionally separate, such depiction is merely for illustrative purposes. It will be apparent to those skilled in the art that the components portrayed in this figure can be arbitrarily combined or divided into separate software, firmware and/or hardware components. Furthermore, it will also be apparent to those skilled in the art that such components, regardless of how they are combined or divided, can execute on the same computing device or multiple computing devices, and wherein the multiple computing devices can be connected by one or more networks.

Referring to FIG. 1, a content analysis module 101 generates the semantic layout of site under surveillance via multi-dimensional scaling (MDS) method based on long-term statistical observations (which can be but are not limited to, photos, video steams, etc.) of the site from a network of cameras. A 3-D layout generation module 102 combines sitemap (i.e., geometric information) of a network of cameras with the scenes (semantic layout) from the content analysis module to generate a 3-D immersive environment on a user navigation interface 108 for a user 110 to navigate. For motion detection, foreground object segmentation is one of fundamental problems in computer vision. When the camera is fixed, the motion cue is widely used to solve this problem and such solutions can be referred to as background subtraction. Video streams from the network of multiple cameras are fed into a background subtraction module 103 to detect and segment moving objects. A morphological operator 104 can be optionally utilized to filter the noise in the output from the background subtraction module. The moving human/objects in the filtered video streams can be tracked by a motion tracking module 105. A blending module 106 can be introduced to highlight the foreground region in the video streams by local alpha blending (with the original video streams), which alleviates the effect of mis-segmentation in the streams and conveys the motion detection results to help the user track the object. The processed video streams can be rendered on multiple video displays 109 on the user navigation interface and integrated with the 3-D layout of the site into the immersive 3-D environment by a rendering module 107 via texture mapping in order to indicate the spatial distribution of the video streams from the various cameras.

Figure 2:
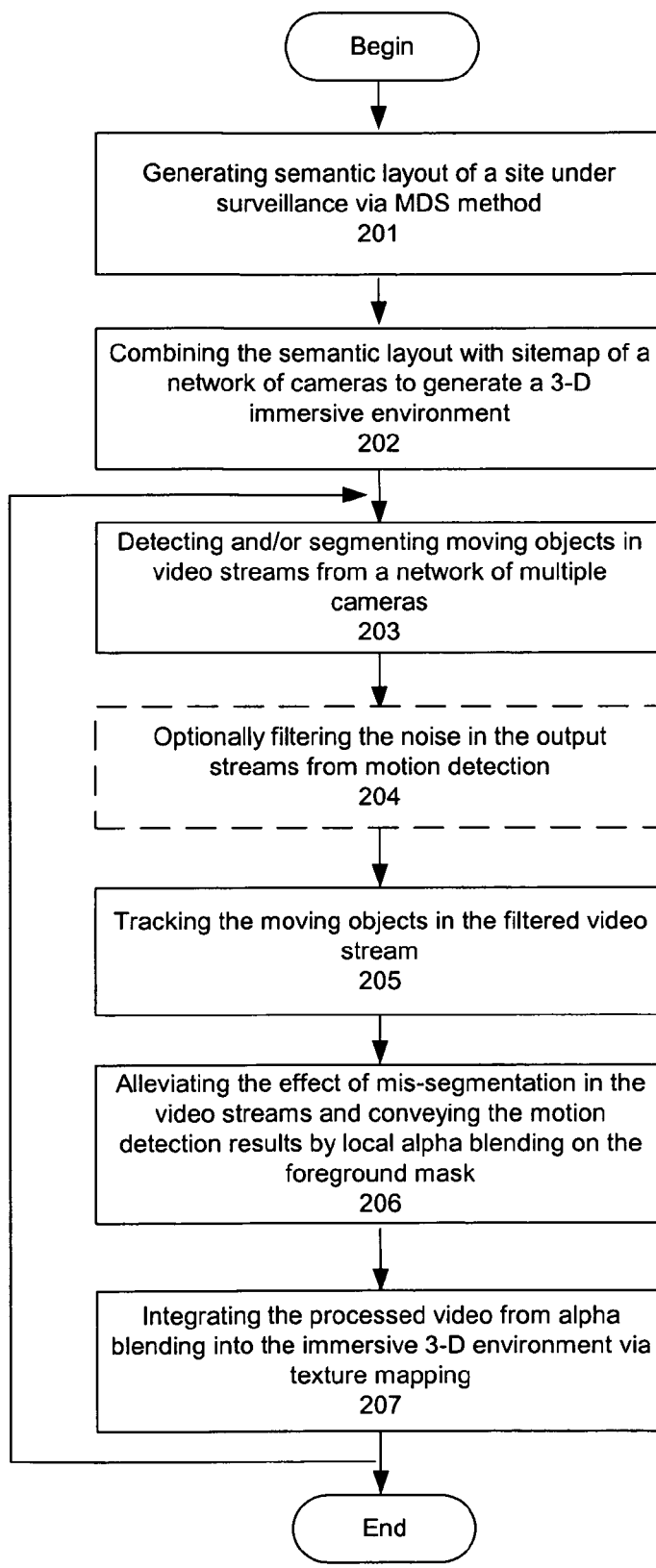
FIG. 2 is a flow chart illustrating an exemplary process of 3-D multi-camera video monitoring in one embodiment of the present invention.

FIG. 2 is a flow chart illustrating an exemplary process of 3-D multi-camera video monitoring and navigation in one embodiment of the present invention. Although this figure depicts functional steps in a particular order for purposes of illustration, the process is not limited to any particular order or arrangement of steps. One skilled in the art will appreciate that the various steps portrayed in this figure could be omitted, rearranged, combined and/or adapted in various ways.

Referring to FIG. 2, a 3-D semantic layout of a site under surveillance is first generated via multidimensional scaling (MDS) method at step 201. The semantic layout from content analysis can then be combined with sitemap (i.e., geometric information) of a network of cameras at step 202 to create a 3-D immersive environment. During video monitoring, moving objects in video streams from the network of multiple cameras can be detected and/or segmented via background subtraction at step 203. The noise in the output from the background subtraction module can be optionally filtered by a morphological operator at step 204 and a motion tracking module is operable to track the moving human/objects in the filtered streams at step 205. The foreground region in the video streams can be highlighted by local alpha blending to alleviate the effect of mis-segmentation in the video streams and convey the motion detection results at step 206. Finally, the processed video streams can be integrated into the immersive 3-D environment via texture mapping at step 207 in order to indicate the spatial distribution of the video streams from the various cameras and allow a user to navigate easily via the user navigation interface. Steps 203-207 can be repeated continuously for the duration of monitoring of the site.

Compared to the prior approaches, the present invention enjoys at least the following advantages:

- Since the content-based placement algorithm is adopted, a 3-D multi-stream video monitoring model can be generated from video streams only without any geometric measurement of the building.
- The foreground segmentation results can be visualized by local alpha blending (used to generate an action keyframe from a sequence of images), which conveys the same amount of segmentation results as using bounding-boxes or object contours, but it is more tolerable to mis-segmentation.
- It can switch between warped video mode and billboard video mode, which efficiently utilize the screen real estate.
- It directs the user's attention to the foreground while watching a video stream instead of generating a single image that represents a sequence of images.
- It keeps a sharp image for both the background and foreground with no blurring introduced to either.

Figure 3A:
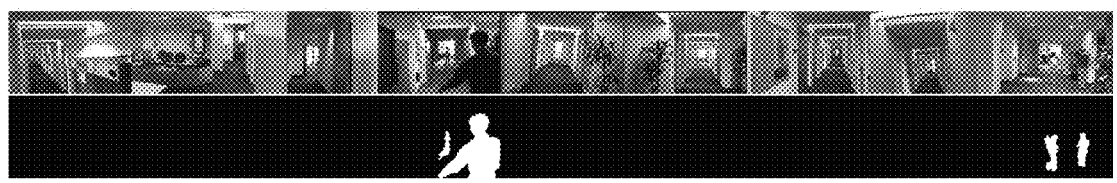
FIGS. 3A-B illustrate exemplary results of the alpha blending on the output of a GMM based motion detection method of moving objects in accordance with one embodiment of the present invention.

In some embodiments, GMM based adaptive background subtraction algorithm can be used by the background subtraction module to detect and segment the moving objects in the video streams. Each pixel in the image is modeled using several (usually 3-5) Gaussian distributions in RGB color space. This allows the system to model a variable background (analogous to trees swaying in the wind) and to keep track of the previous background color distribution even when a pixel color changes due to a foreground object or temporary background changes. The decision to label a pixel as foreground or background is made by scoring each Gaussian based on the total evidence and its variance. It is assumed that background pixels will have more evidence and lower variance than foreground pixels. Mathematically it is equivalent to setting a fixed threshold for the log likelihood, because likelihood is a ratio between the evidence and the variance. The classification is achieved by summing the normalized scores in descending order until a certain percentage is accounted for. All Gaussian kernels that are required to reach this percentage are considered background and all others are labeled as foreground. An exemplary output of the GMM based motion detection method of moving objects is shown in FIG. 3A.

In some embodiments, a Bayesian framework can be constructed to track the moving objects along a corridor. The locations of the objects are hidden variables in the Bayesian filter. The observations of the filter are the sizes and centroids of the motion blobs detected from the cameras at both sides of the corridor. Intuitively, when a person/object moves from one side to another, the scale of the motion blob in one end will increase continuously and that from the other end will decrease accordingly. In the case of tracking multiple moving objects, discriminative tracking can be used to handle the data association problem. In the case of tracking human, face detection and skin color can be used as additional observations to increase the robustness of the tracker.

Due to factors that include but are not limited to, global lighting changes, dynamic backgrounds, cast shadows and speckle lights, the results from the background subtraction module can be noisy. Morphological operator can be applied to filter out the small regions and filled in the small holes. Even after this post-processing, there will be cases, where part of the foreground or background is mis-segmented.

Figure 3B:

In some embodiments, the motion detection based alpha blending can be introduced as the blending module to alleviate the effect of such errors and convey the motion detection results to help the user track the object. The alpha values can be directly derived from the statistics from a foreground/background segmentation algorithm, or confidence scores from an object (pedestrian, face) detection algorithm. The alpha channel of a texture map indicates the transparency value for each pixel in the texture. Since the video stream is shown as texture map, different values can be assigned to different regions in the alpha channel based on the foreground mask shown in FIG. 3(a) to effectively highlight the foreground. An exemplary result of the alpha blending is shown in FIG. 3B. The user can easily change the blending factor and light up the background to inspect the background environment. Unlike painting the foreground with a uniform color, such visualization helps the user to identify the detail in the foreground object, which is typically the object of interest. On the other hand, mis-segmentation will not distract the user as much, because human visual system is insensitive to illumination variance in textured image regions. A more general approach of setting the alpha value is to directly use the log likelihood from the GMM model, where the log likelihood of every pixel need to be first normalized to the range of [0, 255].

Figure 4:
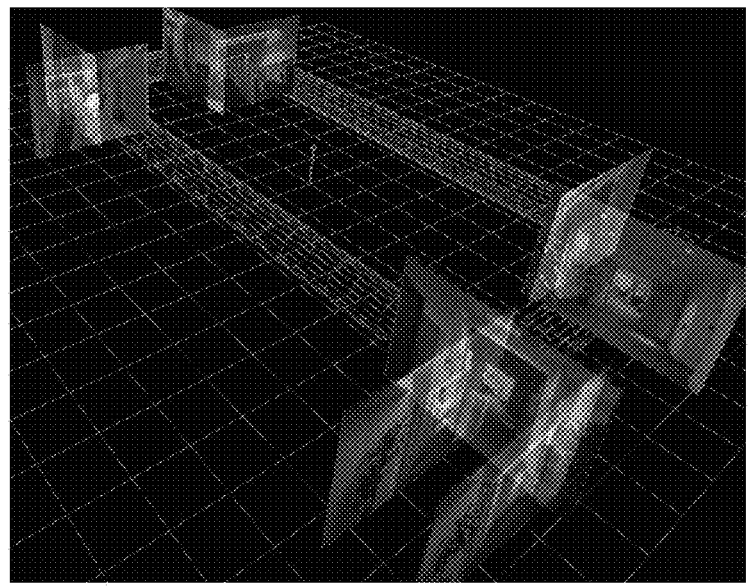
FIG. 4 is an exemplary snapshot of the 3-D layout based on image places of the cameras in accordance with one embodiment of the present invention.

In some embodiments, the video rendering module can put processed video streams into an immersive 3-D environment by texture mapping in order to indicate the spatial distribution of the video streams from the various cameras. When the geometries of the cameras are known, the video streams can be rendered as multiple displays at the sensor planes of the corresponding cameras, as shown by the exemplary snapshot of the 3-D layout in FIG. 4 based on image places of the cameras.

Figure 5A:
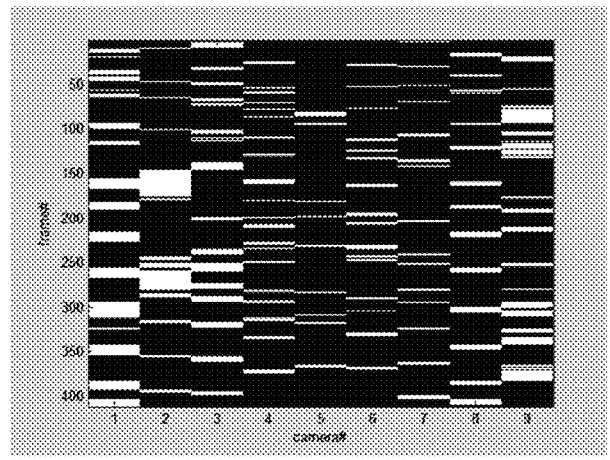
FIGS. 5A-B show exemplary plots and correlations among motion detection across nine cameras on a short segment of 400 frames in accordance with one embodiment of the present invention.
Figure 5B:
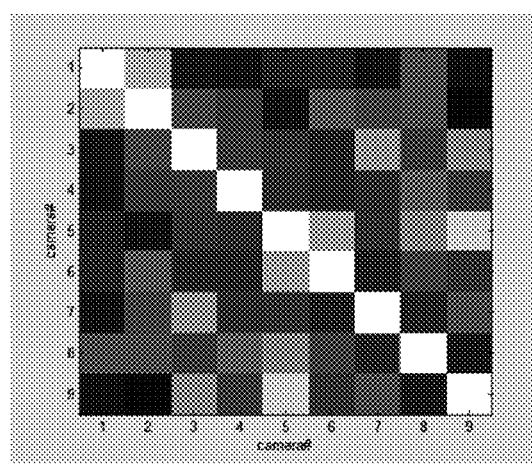

The sensor plane of the camera, however, may not be a good indication of where the camera is focused. For a non-limiting example, when two cameras mounted at each end of a corridor cover the entire hallway, ideally it is more preferable to paste the captured video streams at their corresponding physical location. The idea of content-based display arrangement is that video streams from two cameras looking at the same scene (maybe from different view points) should be rendered closer in space, even though they may be mounted far away from each other. In order to decide the similarity between the fields of view from different cameras, one can collect video streams of daily office activities and detect the amount of motion at each frame. The exemplary result of the motion detection across nine cameras on a short segment of 400 frames is plotted in FIG. 5A. The correlation between different cameras can be used as their pair-wise similarity and an exemplary correlation matrix between the cameras is shown in FIG. 5B.

Figure 6:
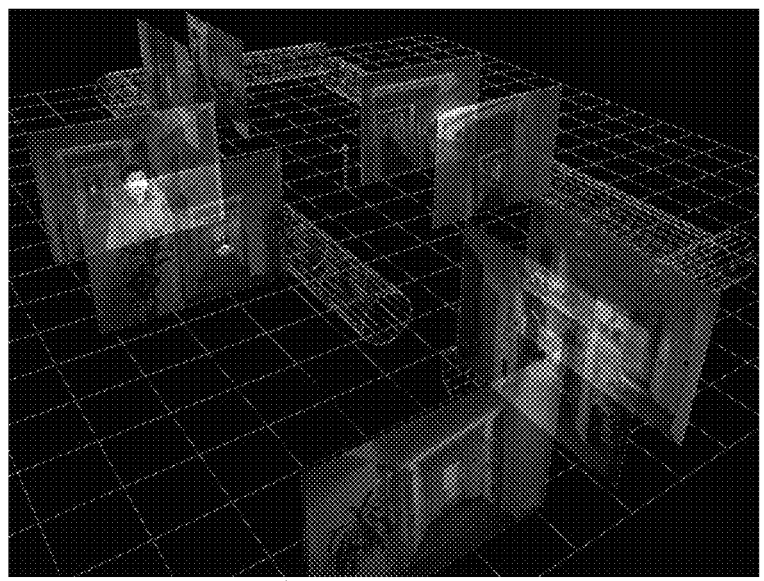
FIG. 6 is an exemplary snapshot of the 3-D layout based on content of the videos from the cameras via MDS in accordance with one embodiment of the present invention.

In some embodiments, a multidimensional scaling (MDS) method can be used by the content analysis module to find a lower dimensional manifold of these camera views assuming each camera view is a point in a high dimensional space. More specifically, one can find a 2-D layout that best preserves the similarity relationship between the video streams from the different cameras by imposing the manifold to be 2-D. Ideally this layout would be the same as the actual layout of the camera views (notice that this layout is different from the physical location where the camera is mounted). However, the MDS solution can be a flipped or rotated version of the same topology since the orientation is not constrained. An exemplary snapshot of the 3-D layout based on content of the video streams from the cameras via MDS is shown in FIG. 6.

Figure 7:
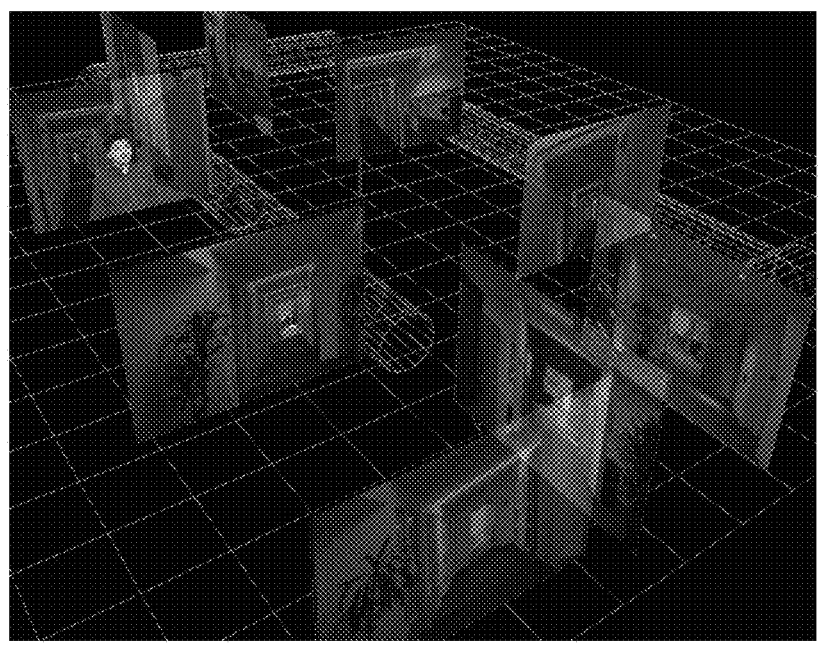
FIG. 7 is an exemplary 3-D layout based on combination of image plane of the cameras and content of the videos form the cameras in accordance with one embodiment of the present invention.
Figure 8:
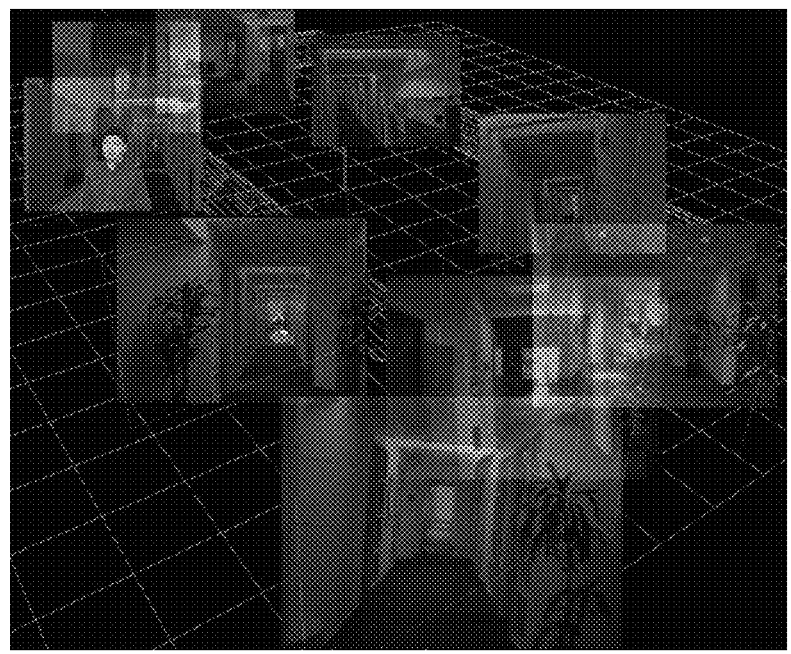
FIG. 8 is an exemplary snapshot of the 3-D layout based on images planes of the cameras in board-show mode in accordance with one embodiment of the present invention.

In some embodiments, physical locations of the cameras can be combined with content-based scene analysis. The user can tune the combination weights according to their preferences via the 3-D layout generation module, and the layout can seamlessly move from pure content-based to pure geometry-based, as shown by the exemplary 3-D layout based on combination of image plane of the cameras and content of the video streams form the cameras in FIG. 7. The displays of the video streams are located somewhere in-between those in FIG. 4 and those in FIG. 6. The system can also switch to billboard mode to maximize the screen utilization, where the orientations of the displays are all parallel to the screen at all times, as shown by the exemplary snapshot of the 3-D layout in FIG. 8.

Figure 9A:
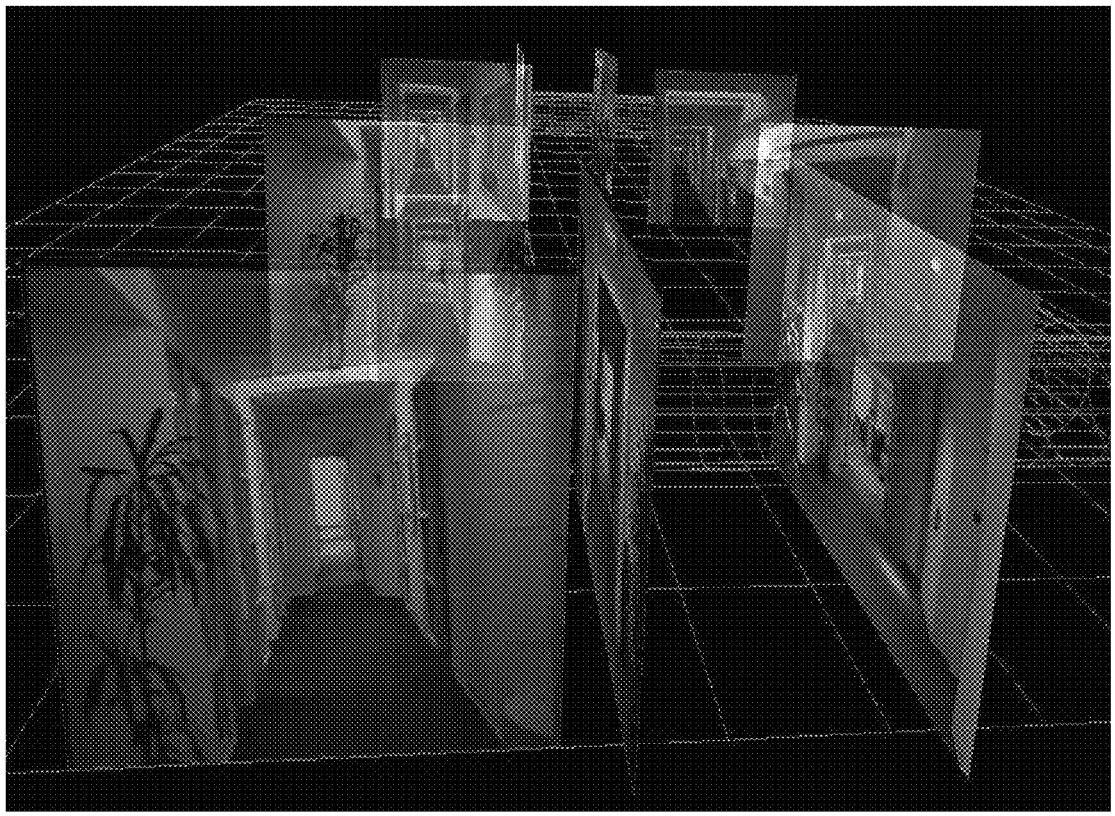
FIGS. 9A-B respectively show two exemplary suggested views for a video display in accordance with one embodiment of the present invention.
Figure 9B:
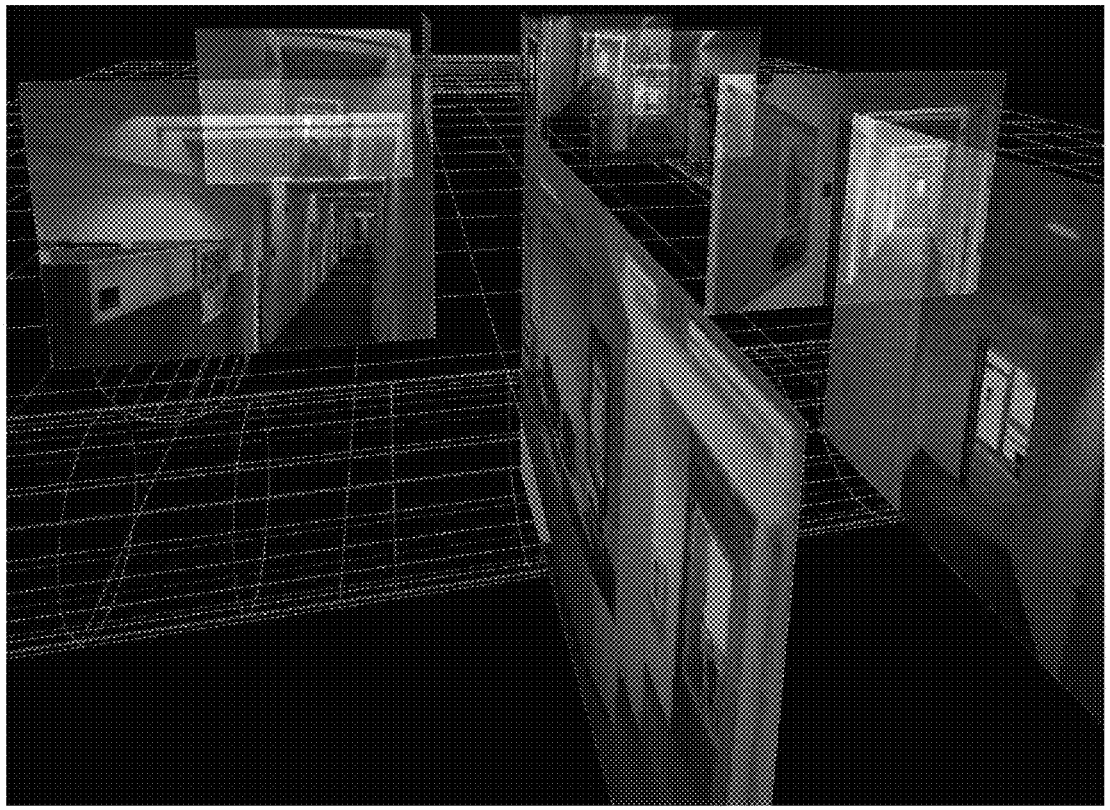
Figure 10A:
FIGS. 10A-G show an exemplary sequence of views when the target is moving in accordance with one embodiment of the present invention.
Figure 10B:
Figure 10C:
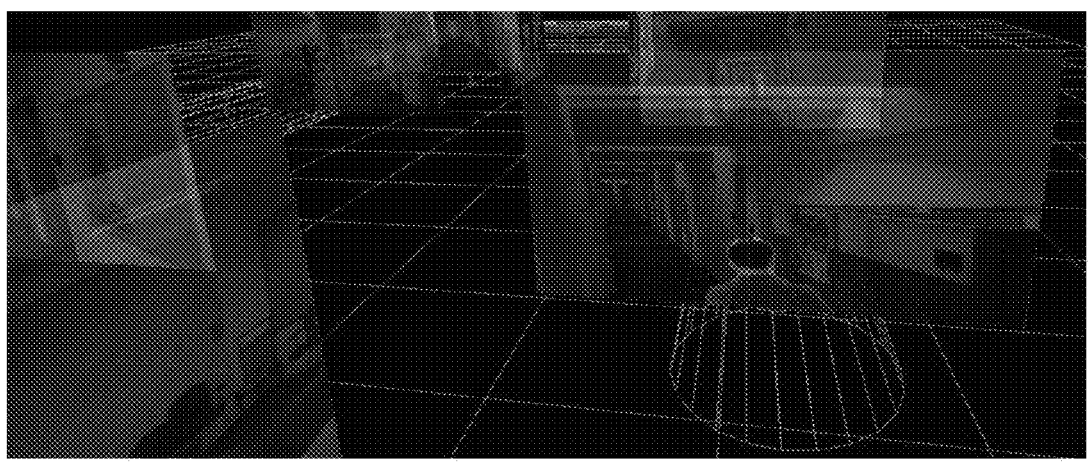
Figure 10D:
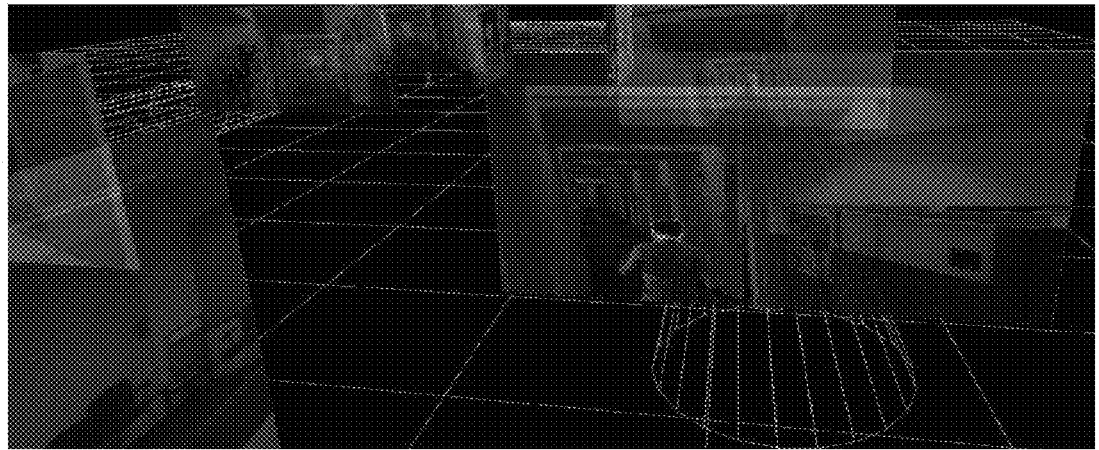
Figure 10E:
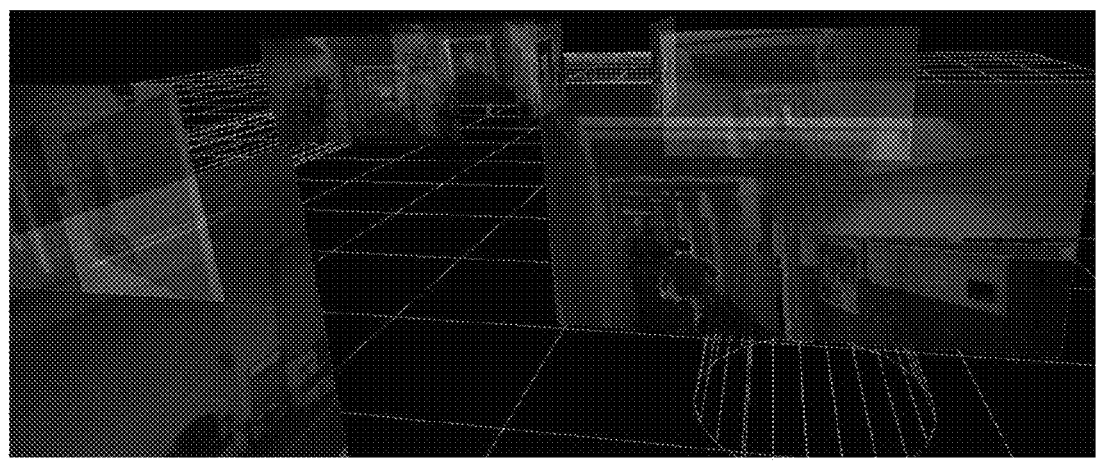
Figure 10F:
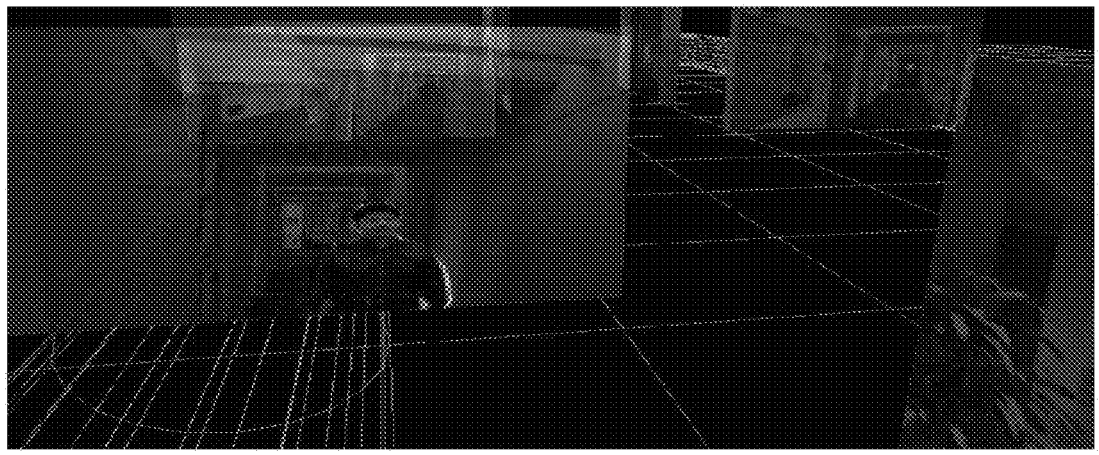
Figure 10G:
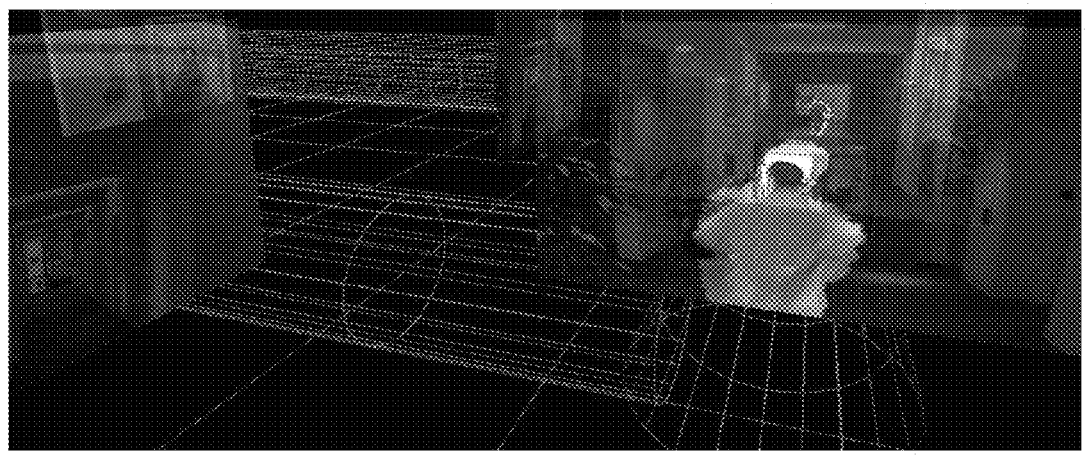

In many Virtual Reality (VR) systems, navigating by dragging the mouse (fly-through) is not effective for quickly switching from one view to another, but in surveillance systems, the user constantly needs to zoom in to a particular view for scrutiny of the scenes with suspicious activities. To facilitate with this task, the present invention provides an interface via the rendering module for the user to switch to the best view of a particular video display by double clicking on a polygon where the video display is mapped onto, wherein these views can be preset during the system setup or specified by the user. Two exemplary suggested views for the video display are shown in FIGS. 9A and 9B, respectively.

In some embodiments, the user can navigate in the immersive environment based on the tracking results reported by the motion tracking module. The user first chooses a target pedestrian for tracking by double-clicking the avatar corresponding to this person. When the target pedestrian moves around, the user's view will follow the person such that the display with the best view of the target person is given the largest screen resolution, while the model and other displays shown at the rest of the screen can still give the user the perception of an immersive environment. An exemplary sequence of views when the target is moving is shown in FIG. 10A-G.

Figure 11:
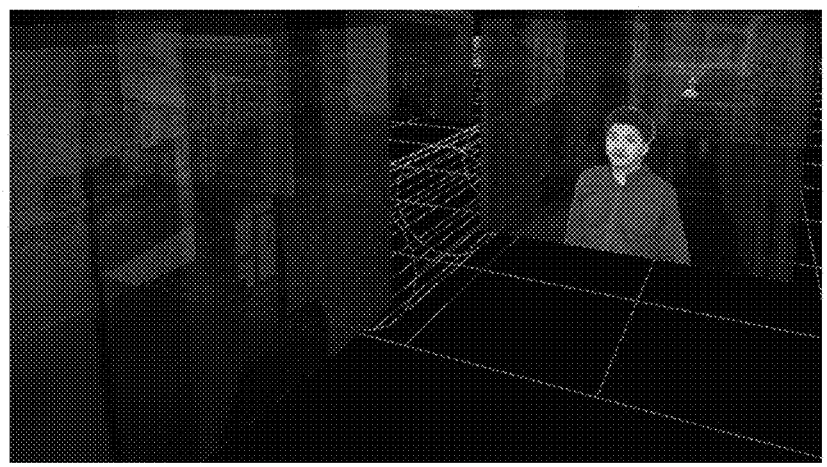
FIG. 11 is an exemplary visualization in the 3-D environment with alpha blending value set to 0.4 in accordance with one embodiment of the present invention.

In some embodiments, the tracking result of the user can be visualized in at least the following two ways:
   Highlighting the foreground region by alpha-blending:
      This visualization requires no hard decision involving the object location. Therefore it is more tolerant to errors made by the automatic foreground segmentation algorithm. An example of the visualization in the 3-D environment with alpha blending value set to 0.4 is shown in FIG. 11.
   Drawing an avatar at the location of the tracked object:
      This kind of visualization involves tracking the 3-D location of the object. Given enough geometric information about the building, it can be reduced to 1-D tracking along the longitude of the corridors. The scale of the bounding box is the most important observation. When the camera capture rate is high enough, the user can use simple dynamic model to track the location of the moving pedestrian. Discriminative data association techniques can be used to register a tracker with each target and switch/split/merge the trackers when the pedestrians interact in the scene.

Such an environment can provide the user with a bird's eye view of the entire region for general patrolling and enables the user to easily track multiple moving humans/objects across all the cameras. Upon any abnormal event, the user can quickly zoom into the best view of the activity and scrutinize the region at the maximum resolution of their desktop monitor. When a person/object moves out of the view of one camera, the system will search for it in the video streams from the neighboring cameras or follow it by flying through the CG environment.

In some embodiments, the tracker can be initialized by a pedestrian detector at the first sight of a new moving object. A single frame pedestrian detector such as (an AdaBoost-based one) can be adopted that works reasonably well and does not rely on foreground segmentation.

One embodiment may be implemented using a conventional general purpose or a specialized digital computer or microprocessor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits or by interconnecting an appropriate network of conventional component circuits, as will be readily apparent to those skilled in the art.

One embodiment includes a computer program product which is a machine readable medium (media) having instructions stored thereon/in which can be used to program one or more computing devices to perform any of the features presented herein. The machine readable medium can include, but is not limited to, one or more types of disks including floppy disks, optical discs, DVD, CD-ROMs, micro drive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data. Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, execution environments/containers, and applications.

The foregoing description of the preferred embodiments of the present invention has been provided for the purposes of illustration and description. It is not intended to be exhaustive or to limit the invention to the precise forms disclosed. Many modifications and variations will be apparent to the practitioner skilled in the art. Particularly, while the concept "interface" is used in the embodiments of the systems and methods described above, it will be evident that such concept can be interchangeably used with equivalent concepts such as, bean, class, method, type, component, object model, and other suitable concepts. Embodiments were chosen and described in order to best describe the principles of the invention and its practical application, thereby enabling others skilled in the art to understand the invention, the various embodiments and with various modifications that are suited to the particular use contemplated. It is intended that the scope of the invention be defined by the following claims and their equivalents.

The entire disclosure of U.S. patent application Ser. No. 11/220,839, entitled SYSTEM AND METHOD FOR ANALYZING AND MONITORING 3-D VIDEO STREAMS FROM MULTIPLE CAMERAS by Hanning Zhou et al, filed concurrently including specification, claims, drawings and abstract is incorporated herein by reference in its entirety.

What is claimed is:

1. A video surveillance system coupled with a plurality of cameras, comprising:
   one or more microprocessors;
   memory storing instructions for execution by the one or more microprocessors, the instructions including:
      a content analysis module operable to generate a 3-D layout of a site under surveillance, the 3-D layout representing respective locations of a plurality of polygons for mapping video streams from the plurality of cameras;
      a rendering module operable to render one or more video streams by mapping respective video streams from respective cameras onto respective polygons represented by the 3-D layout; and
   a user navigation interface operable to display the one or more video streams.

2. The system according to claim 1, further comprising:
   a 3-D layout generation module operable to update the 3-D layout based at least on sitemap of the plurality of cameras and the layout.

3. The system according to claim 2, wherein:
   the user navigation interface is further operable to allow the user to select between a content-based mode and a geometry-based mode.

4. The system according to claim 1, further comprising at least one of:
   a background subtraction module operable to detect and segment the moving object in the video streams;
   a morphological operator operable to filter noise in the video streams from the background subtraction module;
   a motion tracking module operable to track the moving object in the video streams; and
   a blending module operable to highlight the foreground region of the video streams by alpha blending.

5. The system according to claim 4, wherein:
   the blending module is operable to derive alpha values directly from at least one of:
      statistics from a foreground/background segmentation method; and
      confidence scores from an object detection method.

6. The system according to claim 1, wherein:
   the moving object includes a human and/or its face.

7. The system according to claim 1, wherein:
   the content analysis module is operable to generate the 3-D layout in accordance with a multidimensional scaling method based on information from the plurality of cameras.

8. The system according to claim 1, wherein:
   the rendering module is operable to render the one or more video streams by texture mapping the respective video streams from the respective cameras onto the respective polygons.

9. The system according to claim 1, wherein:
   the rendering module is further operable to render orientations of the plurality of polygons parallel to a display screen at all times on the user navigation interface.

10. The system according to claim 1, wherein:
    the user navigation interface is further operable to allow a user to track a respective location of a respective moving object.

11. A method to support 3-D multi-camera video navigation, at a video surveillance system coupled with a plurality of cameras, the video surveillance system including one or more microprocessors and memory storing instructions for execution by the one or more microprocessors, the method comprising:
    generating a 3-D layout of a site under surveillance, the 3-D layout representing respective locations of a plurality of polygons for mapping video streams from the plurality of cameras;
    rendering one or more video streams by mapping respective video streams from respective cameras onto respective polygons represented by the 3-D layout; and
    displaying the one or more video streams.

12. The method according to claim 11, further comprising:
    updating the 3-D layout based at least on sitemap of the plurality of cameras and the layout.

13. The method according to claim 12, further comprising:
    receiving a user selection between a content-based mode and a geometry-based mode via the user navigation interface.

14. The method according to claim 11, further comprising at least one of:
    detecting and segmenting the moving object in the video streams via background subtraction;
    filtering noise in the video streams via morphological operation;
    tracking the moving object in the video streams; and
    highlighting the foreground region of the video streams by alpha blending.

15. The method according to claim 14, further comprising:
    deriving alpha values directly from at least one of:
       statistics from a foreground/background segmentation method; and
       confidence scores from an object detection method.

16. The method according to claim 11, further comprising at least one of:
    generating the layout in accordance with a multidimensional scaling method based on information from the plurality of cameras; and
    rendering the one or more video streams by texture mapping the respective video streams from the respective cameras onto the respective polygons.

17. The method according to claim 11, further comprising:
    rendering orientations of the plurality of polygons parallel to a display screen at all times on the user navigation interface.

18. The method according to claim 11, further comprising:
tracking a respective location of a respective moving object via the user navigation interface.

19. A non-transitory machine readable medium having instructions stored thereon that when executed by a video surveillance system cause the video surveillance system to:
generate a 3-D layout of a site under surveillance, the 3-D layout representing respective locations of a plurality of polygons for mapping video streams from the plurality of cameras;
render one or more video streams by mapping respective video streams from respective cameras onto respective polygons represented by the 3-D layout; and
displaying the one or more video streams.

20. A video surveillance system coupled with a plurality of cameras, comprising:
means for generating a 3-D layout of a site under surveillance, the 3-D layout representing respective locations of a plurality of polygons for mapping video streams from the plurality of cameras;
means for rendering one or more video streams by mapping respective video streams from respective cameras onto respective polygons represented by the 3-D layout; and
means for displaying the one or more video streams.

21. The system of claim 1, wherein the user navigation interface is operable to:
receive an input from a user to track a moving object in the video streams; and
display a video stream having a best view of the object or a video stream with a largest screen resolution having a view of the object.

* * * * *